US012712943B2

(12) United States Patent
Zhu et al.

(10) Patent No.: US 12,712,943 B2
(45) Date of Patent: Aug. 18, 2026

(54) DATA PROCESSING SYSTEM AND METHOD AND DEVICE

(71) Applicant: HUAWEI TECHNOLOGIES CO., LTD., Shenzhen (CN)

(72) Inventors: Xiaoming Zhu, Shanghai (CN); Jea Woong Hyun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 157 days.

(21) Appl. No.: 18/746,450

(22) Filed: Jun. 18, 2024

(65) Prior Publication Data

US 2024/0340343 A1 Oct. 10, 2024

Related U.S. Application Data

(63) Continuation of application No. PCT/CN2022/137149, filed on Dec. 7, 2022.

(30) Foreign Application Priority Data

Dec. 21, 2021 (CN) ......................... 202111574394.8
Feb. 18, 2022 (CN) ......................... 202210150396.2

(51) Int. Cl.
*G06F 15/16* (2006.01)
*H04L 67/1097* (2022.01)

(52) U.S. Cl.
CPC ................................ *H04L 67/1097* (2013.01)

(58) Field of Classification Search
CPC ............. H04L 67/1097; H04L 41/5003; G06F 11/3414; G06F 11/3433; G06F 11/3485
See application file for complete search history.

(56) References Cited

U.S. PATENT DOCUMENTS 8,751,699 B1 6/2014 Tsai et al.
2010/0248771 A1* 9/2010 Brewer ................ H04W 72/56 455/518
2015/0121391 A1* 4/2015 Wang .................... G06F 9/5044 718/104
2018/0032274 A1* 2/2018 Maroney ............... G06F 3/0619
2019/0042386 A1* 2/2019 Barczak ................ G06F 3/0632
2020/0167098 A1 5/2020 Shah et al.

OTHER PUBLICATIONS

Extended European Search Report in European Appln. No. 22909749.8, mailed on Feb. 12, 2025, 9 pages.
Stenfort et al., " NVMe Cloud SSD Specification Version 1.0," Mar. 18, 2020, 72 pages.

* cited by examiner

*Primary Examiner* — Yves Dalencourt
(74) *Attorney, Agent, or Firm* — Fish & Richardson P.C.

(57) ABSTRACT

Example data processing methods and apparatus are described. The data processing system includes an application server and a storage device. After receiving a first management request, the storage device configures a processing mode of the storage device for a data access request. The application server sends a data access request to the storage device, where the data access request is a request to access data stored in the storage device. The storage device processes, based on the processing mode, the data access request sent by the application server, and accesses the stored data.

20 Claims, 5 Drawing Sheets

DATA PROCESSING SYSTEM AND METHOD AND DEVICE

CROSS-REFERENCE TO RELATED APPLICATIONS

This application is a continuation of International Application No. PCT/CN2022/137149, filed on Dec. 7, 2022, which claims priorities to Chinese Patent Application No. 202111574394.8, filed on Dec. 21, 2021 and Chinese Patent Application No. 202210150396.2, filed on Feb. 18, 2022. All of the aforementioned patent applications are hereby incorporated by reference in their entireties.

TECHNICAL FIELD

This application relates to the field of storage technologies, and in particular, to a data processing system and method and a device.

BACKGROUND

In the storage field, different users may send data access requests to a storage device by using applications deployed on client devices, to access data. The storage device needs to process the data access requests initiated by the different users and different applications. In an actual application scenario, different data access requests have different processing requirements. For example, different users have different latency requirements for data access requests. For example, an enterprise-level user has a high latency requirement, and an individual user has a low latency requirement. Data access requests initiated by different applications also have corresponding latency requirements. For example, a file management application has a high latency requirement, and a file storage application has a low latency requirement.

When a storage device processes a data access request, a processing requirement of the data access request needs to be met to the fullest extent. However, currently, a processing mode of the storage device for the data access request is simple and single. For example, to meet latency requirements, before data access requests arrive at the storage device, a sequence in which the data access requests arrive at the storage device is adjusted based on latency requirements of the data access requests. Actually, when the storage device is heavily loaded, the latency requirements cannot be completely met only by adjusting the sequence in which the data access requests arrive at the storage device. For another example, to ensure processing efficiency of data access requests, the data access requests are allocated to an idle storage device. Actually, a case in which all storage devices in a storage system are in a working state always exists. Such a manner of allocating the data access requests to the idle storage device cannot completely ensure the processing efficiency of the data access requests.

SUMMARY

This application provides a data processing system and method and a device, to improve flexibility of a processing mode for a data access request.

According to a first aspect, an embodiment of this application provides a data processing system. The data processing system includes an application server and a node in a storage system. In this embodiment of this application, the node in the storage system is referred to as a storage device. In the data processing system, the application server can manage the storage device, to change a processing mode of the storage device for a data access request. For example, the application server may send a first management request to the storage device, where the first management request is used to request to configure the processing mode of the storage device for the data access request. After receiving the first management request, the storage device may configure, based on the first management request, the processing mode of the storage device for the data access request. Then, the application server may send a data access request to the storage device, where the data access request is used to request to access data stored in the storage device. The storage device may process, based on the processing mode, the data access request sent by the application server, and access the stored data.

According to the foregoing system, the application server may indicate the storage device to change the processing mode for the data access request, so that the processing mode of the storage device for the data access request is no longer single, and the data access request can be flexibly processed. Therefore, the processing mode of the storage device for the data access request can well match a current scenario.

In a possible implementation, the processing mode of the storage device for the data access request may be represented in a plurality of aspects. For example, a working mode of the storage device may affect the processing mode for the data access request, and a processing priority (priority for short) of the storage device for the data access request may also affect the processing mode for the data access request. The first management request may be used to request to configure the working mode of the storage device, or may be used to request to configure the priority of the data access request. In this way, when configuring, based on the first management request, the processing mode of the storage device for the data access request, the storage device may configure the working mode of the storage device based on the first management request, and may further configure the processing priority of the data access request based on the first management request.

It should be noted that, herein, only an example in which the processing mode for the data access request is affected is used. During actual application, when a main purpose is not to change the processing mode for the data access request, the application server may also request, by sending the first management request, the storage device to configure the working mode.

According to the foregoing system, the storage device changes the processing mode for the data access request by configuring the working mode of the storage device or the priority of the data access request. A manner is flexible and is applicable to different scenarios.

In a possible implementation, when configuring the working mode of the storage device based on the first management request, the storage device may further adjust a working mode of a hard disk of the storage device. The storage device may send a management command to the hard disk of the storage device based on the first management request, where the management command is used to request to configure the working mode of the hard disk.

In this embodiment of this application, different working modes may be configured on a hard disk side, and the storage device only needs to notify, by using the management command, the hard disk of the working mode that needs to be switched to. In some scenarios, the management command may also indicate a specific adjustment manner to configure the working mode of the hard disk. The adjustment manner refers to adjustment of some parameters of the hard disk, such as a throughput and background operation frequency.

According to the foregoing system, the storage device may adjust the working mode of the hard disk to cooperate with adjustment of the working mode of the storage device, and further ensure that the working mode of the storage device can match the currently needed processing mode for the data access request.

In a possible implementation, in addition to adjusting the working mode of the storage device and the priority of the data access request, the application server may further deliver a computing task to the storage device. For example, the application server may send a second management request to the storage device, where the second management request is used to deliver a first computing task to the storage device. After receiving the second management request, the storage device may execute the first computing task based on the second management request, and feed back a computation result of the first computing task to the application server.

According to the foregoing system, the storage device can complete the computing task at the request of the application server, and feed back the computation result of the computing task, so that the storage device can implement data computing in addition to data storage, to ensure that resources of the storage device can be effectively used.

In a possible implementation, the application server may decompose the computing task. After receiving a second computing task triggered by a user, the application server may decompose the second computing task into a plurality of small computing tasks. The plurality of small computing tasks include the first computing task.

According to the foregoing system, the application server may implement decomposition of the computing task, and small computing tasks obtained through decomposition may be configured for different storage devices, to ensure that the computing task can be efficiently completed.

In a possible implementation, there are a plurality of types of computing tasks. The computing task includes but is not limited to: data search, data migration, data computing, data encoding/decoding, data sorting, and data compression.

According to the foregoing system, the plurality of types of computing tasks are applicable to different computing scenarios.

In a possible implementation, the application server may further obtain a status of the hard disk of the storage device. The application server may obtain a status of a virtual hard disk, where the virtual hard disk refers to a hard disk virtualized from hard disks in the storage device, or may obtain a status of a single hard disk in the storage device. For example, the application server may send a third management request to the storage device, where the third management request is used to request to monitor the hard disk of the storage device. After receiving the third management request, the storage device may monitor the hard disk of the storage device based on the third management request, and feed back the status of the hard disk to the application server.

According to the foregoing system, the application server may further monitor the hard disk of the storage device, to learn of the status of the hard disk in the storage device in a timely manner.

In a possible implementation, when monitoring the hard disk of the storage device, the storage device may send a monitoring command to the hard disk of the storage device based on the third management request, where the monitoring command is used to request to feed back the status of the hard disk. When receiving the monitoring command, the hard disk may identify the monitoring command and send a monitoring response to the storage device, where the monitoring response carries the status of the hard disk.

According to the foregoing system, the storage device may conveniently and quickly obtain the status of the hard disk by sending the monitoring command, to ensure that the status of the hard disk obtained by the storage device is real-time.

In a possible implementation, the status of the hard disk includes but is not limited to: a service life of the hard disk, a latency of the hard disk, an error condition of the hard disk, and whether the hard disk works normally.

According to the foregoing system, the status of the hard disk is represented in a plurality of manners, so that the storage device can learn of the status of the hard disk from different aspects.

According to a second aspect, an embodiment of this application provides a data processing method. The method may be performed by a storage device in a storage system. For beneficial effects, refer to related descriptions of the first aspect. Details are not described herein again. In the method, the storage device may receive a first management request sent by an application server, where the first management request is used to request to configure a processing mode of the storage device for a data access request. After receiving the first management request, the storage device may configure, based on the first management request, the processing mode of the storage device for the data access request. Then, the storage device processes, based on the processing mode, the data access request sent by the application server.

In a possible implementation, when configuring, based on the first management request, the processing mode of the storage device for the data access request, the storage device may configure a working mode of the storage device based on the first management request. The storage device may alternatively configure a processing priority of the data access request based on the first management request.

In a possible implementation, when the storage device configures the working mode of the storage device based on the first management request, the storage device may send a management command to a hard disk of the storage device based on the first management request, where the management command is used to request to configure a working mode of the hard disk.

In a possible implementation, the storage device may further receive a second management request sent by the application server, where the second management request is used to deliver a first computing task to the storage device. After the storage device receives the second management request, the storage device may execute the first computing task based on the second management request, and feed back a computation result of the first computing task to the application server.

In a possible implementation, the computing task includes a part or all of the following: data search, data migration, data computing, data encoding/decoding, data sorting, and data compression.

In a possible implementation, the storage device may further receive a third management request sent by the application server, where the third management request is used to request to monitor the hard disk of the storage device. After receiving the third management request, the storage device may monitor the hard disk of the storage device based on the third management request, and feed back a status of the hard disk to the application server.

In a possible implementation, when the storage device monitors the hard disk of the storage device based on the third management request, the storage device may send a monitoring command to the hard disk of the storage device based on the third management request, where the monitoring command is used to request to feed back the status of the hard disk. The storage device may receive a monitoring response from the hard disk, where the monitoring response includes the status of the hard disk.

In a possible implementation, the status of the hard disk includes a part or all of the following:

a service life of the hard disk, a latency of the hard disk, an error condition of the hard disk, and whether the hard disk works normally.

According to a third aspect, an embodiment of this application provides a data processing method. The method may be performed by an application server. For beneficial effects, refer to related descriptions of the first aspect. Details are not described herein again. The application server may send a first management request to a storage device, where the first management request is used to request to configure a processing mode of the storage device for a data access request. The application server may further send a data access request to the storage device, where the data access request is used to request to access data stored in the storage device, so that the storage device can process the received data access request based on the processing mode.

In a possible implementation, the processing mode of the storage device for the data access request may be a working mode of the storage device, or may be a processing priority of the data access request.

In a possible implementation, the application server may deliver a computing task to the storage device. For example, the application server may send a second management request to the storage device, where the second management request is used to deliver a first computing task to the storage device. Then, the application server may further obtain a computation result of the first computing task from the storage device.

In a possible implementation, the application server may further decompose the computing task. For example, the application server may receive a second computing task triggered by a user, and decompose the second computing task to obtain the first computing task.

In a possible implementation, the application server may further send a third management request to the storage device, where the third management request is used to request to monitor a hard disk of the storage device. Then, the application server may further obtain the status of the hard disk of the storage device from the storage device.

According to a fourth aspect, an embodiment of this application further provides a storage device. The storage device has a function of implementing behavior in the method instance in the second aspect. For beneficial effects, refer to the descriptions of the second aspect. Details are not described herein again. The function may be implemented by hardware, or may be implemented by hardware executing corresponding software. The hardware or the software includes one or more modules corresponding to the foregoing function. In a possible design, a structure of the apparatus includes a virtual management module and an application programming interface (API), that is, a second API in this embodiment of this application. The virtual management module may run on a processor or a network interface card. The virtual management module and the API may cooperate to perform corresponding functions in the method example in the second aspect. For details, refer to the detailed descriptions in the method example. Details are not described herein again.

According to a fifth aspect, an embodiment of this application further provides an application server. The application server has a function of implementing behavior in the method instance in the third aspect. For beneficial effects, refer to the descriptions of the third aspect. Details are not described herein again. The function may be implemented by hardware, or may be implemented by hardware executing corresponding software. The hardware or the software includes one or more modules corresponding to the foregoing function. In a possible design, a structure of the application server includes a user management module and an API, that is, a first API in this embodiment of this application. The user management module and the API may perform corresponding functions in the method example in the third aspect. For details, refer to the detailed descriptions in the method example. Details are not described herein again.

According to a sixth aspect, an embodiment of this application further provides a computing device. The computing device has a function of implementing behavior in the method instance in the second aspect. For beneficial effects, refer to the descriptions of the second aspect. Details are not described herein again. A structure of the computing device includes a processor, a network interface card, and a storage. The processor or the network interface card is configured to support the computing device in performing corresponding functions in the method in the second aspect. The storage is coupled to the processor, and stores program instructions and data that are necessary for the computing device. The structure of the computing device further includes a communication interface, configured to: communicate with another device, for example, receive a first management request, a second management request, a third management request, and a data access request, send a computation result of a first computing task, and send a status of a hard disk.

According to a seventh aspect, an embodiment of this application further provides a computing device. The computing device has a function of implementing behavior in the method instance in the third aspect. For beneficial effects, refer to the descriptions of the third aspect. Details are not described herein again. A structure of the computing device includes a processor and a storage. The processor is configured to support the computing device in performing corresponding functions in the method in the third aspect. The storage is coupled to the processor, and stores program instructions and data that are necessary for the computing device. The structure of the computing device further includes a communication interface, configured to: communicate with another device, for example, send a first management request, a second management request, a third management request, and a data access request, receive a computation result of a first computing task, and send a status of a hard disk.

According to an eighth aspect, this application further provides a computer-readable storage medium. The computer-readable storage medium stores instructions. When the instructions are run on a computer, the computer is enabled to perform the method in the second aspect and the possible implementations of the second aspect. Alternatively, when the instructions are run on a computer, the computer is enabled to perform the method in the third aspect and the possible implementations of the third aspect.

According to a ninth aspect, this application further provides a computer program product including instructions. When the computer program product runs on a computer, the computer is enabled to perform the method in the second aspect and the possible implementations of the second aspect. Alternatively, when the computer program product runs on a computer, the computer is enabled to perform the method in the third aspect and the possible implementations of the third aspect.

According to a tenth aspect, this application further provides a computer chip. The chip is connected to a storage. The chip is configured to read and execute a software program stored in the storage, to perform the method in the second aspect and the possible implementations of the second aspect. Alternatively, the chip is configured to read and execute a software program stored in the storage, to perform the method in the third aspect and the possible implementations of the third aspect.

DESCRIPTION OF EMBODIMENTS

Figure 1:
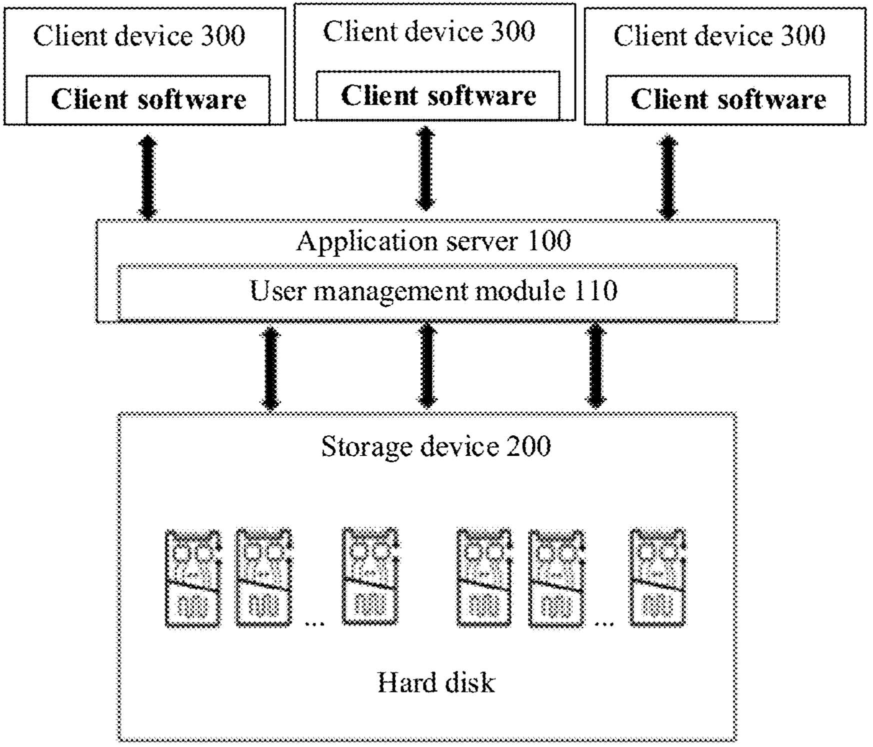
FIG. 1 is a schematic diagram of a system architecture according to this application.

FIG. 1 is a schematic diagram of an architecture of a data processing system according to an embodiment of this application. The data processing system includes an application server 100 and a storage device 200.

The application server 100 and the storage device 200 may exchange data with each other. In this embodiment of this application, there may be two types of interaction between the application server 100 and the storage device 200. One type is interaction performed when the application server 100 accesses data stored in the storage device 200. The other type is interaction performed when the application server 100 manages the storage device 200.

When accessing the data stored in the storage device 200, the application server 100 may write data into the storage device 200, or may read data from the storage device 200. In this embodiment of this application, a request message sent by the application server 100 to access the data stored in the storage device 200 is a data access request. The data access request includes a data write request used to request to write data and a data read request used to request to read data.

The management performed by the application server 100 on the storage device 200 includes but is not limited to: configuring a working mode, setting a priority for the storage device 200 to process the data access request, delivering a computing task, monitoring a hard disk of the storage device 200, and the like. In this way, the storage device 200 may configure the working mode, process the data access request based on the priority, execute the computing task, and monitor the hard disk under the management of the application server 100. In this embodiment of this application, a request message sent by the application server 100 to manage the storage device 200 may be referred to as a management request. There are a plurality of types of management requests, for example, a management request used to request to configure a working mode (for ease of distinguishing between different management requests, the management request may also be referred to as a configuration request), a management request used to request to set a priority for the storage device 200 to process the data access request (for ease of distinguishing between different management requests, the management request may also be referred to as a setting request), a management request used to deliver a computing task (for ease of distinguishing between different management requests, the management request may also be referred to as a computation request), and a management request used to request to monitor a hard disk of the storage device 200 (for ease of distinguishing between different management requests, the management request may also be referred to as a monitoring request).

In addition, the storage device 200 may also independently implement some management functions. For example, the storage device 200 may independently adjust the working mode, set the priority for processing the data access request, and monitor the hard disk.

Regardless of whether the application server 100 manages the storage device 200 or the storage device 200 performs self-management, the processing mode of the storage device 200 for the data access request is changed to some extent. In this way, the processing mode of the storage device 200 for the data access request is no longer single, and the processing mode for the data access request is applicable to more diversified scenarios, to ensure that performance of the storage device 200 is maximized in different scenarios.

In addition, in a cloud scenario, a quantity of data access requests always changes with time. In addition to the changing quantity of data access requests, different users have different processing requirements, such as latencies, of the storage device 200 for the data access request. It can be learned that, in the cloud scenario, the requirement changes elastically. The interaction between the application server 100 and the storage device 200 in this system architecture provided in this embodiment of this application can change the processing mode of the storage device 200 for the data access request, and can well match the cloud scenario.

The following separately describes the application server 100 and the storage device 200.

I. Application Server 100

In an application scenario shown in FIG. 1, the application server 100 may be a device that is deployed near a user side and that runs an application such as client software. In this case, the application server 100 may also be referred to as a client device 300. A user may trigger, based on a requirement of the user or the current scenario by using the application running on the application server 100, the application server 100 to generate the request message (such as the data access request and the management request), to request to perform a corresponding operation based on the request message, for example, access the data stored in the storage device 200 (in this case, the request message may be understood as the data access request), configure the working mode of the storage device 200, set the priority for processing the data access request, executing the computing task, and monitor a running status of the hard disk in the storage device 200.

The application server 100 may alternatively be an intermediate device between the client device 300 and the storage device 200. The intermediate device can forward the data access request that is from the client device 300 and that is used to access the data in the storage device 200, and may further generate and send, when triggered by the user, the management request, for example, the configuration request used to configure the working mode of the storage device 200, the computation request used to request to execute the computing task, the setting request used to set the priority for processing the data access request by the storage device 200, and the monitoring request used to monitor the hard disk in the storage device 200. FIG. 1 shows only an example of a case in which the application server 100 is the intermediate device.

The application server 100 may be a physical machine or a virtual machine. The physical application server 100 includes but is not limited to a desktop computer, a server, a notebook computer, and a mobile device. The application server 100 interacts with the storage device 200 through a switch. However, the switch is only an optional device, and the application server 100 may alternatively directly communicate with the storage device 200 by using a network.

Regardless of whether the application server 100 serves as the client device 300 near the user side or the intermediate device between the client device 300 and the storage device 200, in addition to sending, to the storage device 200, the data access request used to request to access the data, the application server 100 may further initiate, based on the user requirement or the current scenario, the management request, for example, the configuration request, the computation request, the setting request, and the monitoring request. The management request can manage the storage device 200, to ensure that the processing mode of the storage device 200 for the data access request can meet the user requirement or match the current scenario.

Figure 2:
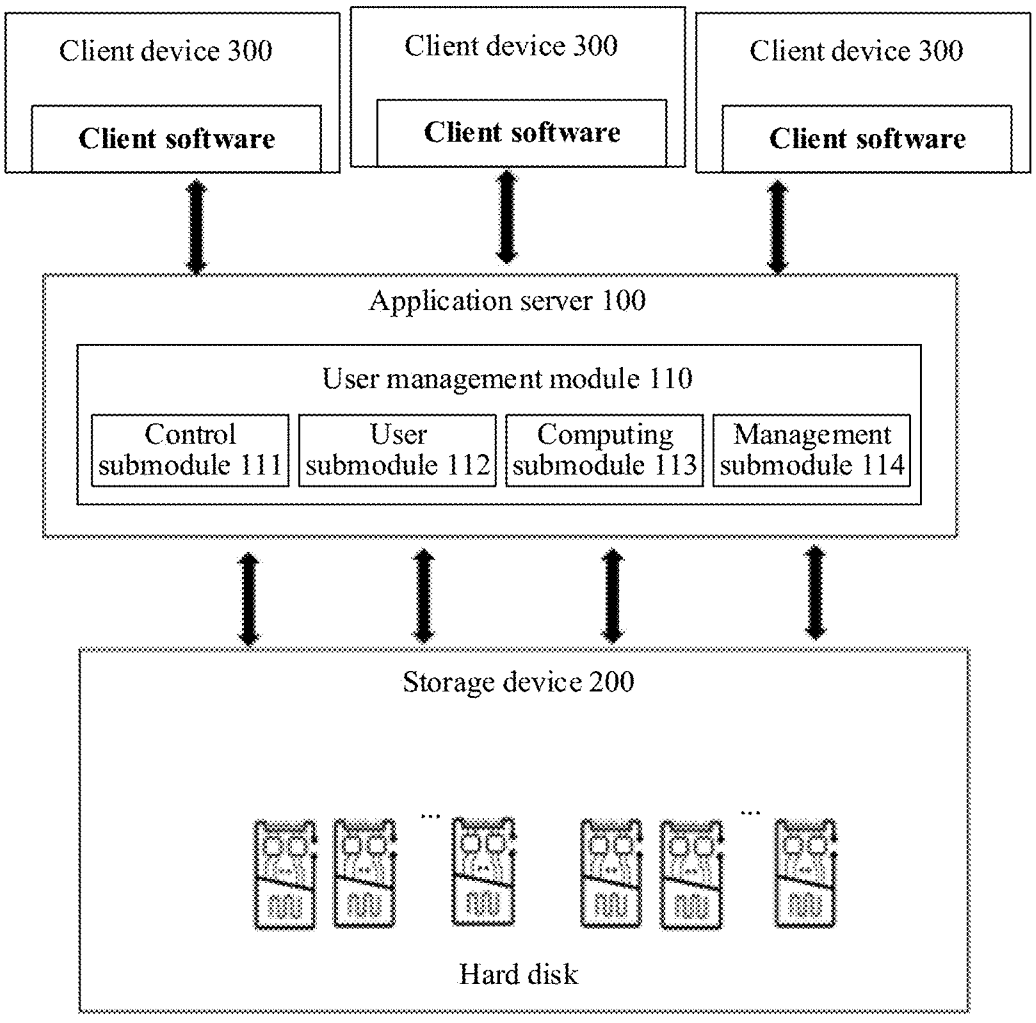
FIG. 2 is a schematic diagram of a structure of an application server according to this application.

As shown in FIG. 2, to implement a function of managing the storage device 200 by the application server 100, a user management module 110 is deployed on the application server 100. The user management module 110 may be understood as a software module running on the application server 100. A first API is further configured on the application server 100. The first API is configured to implement interaction with the storage device. The application server 100 may invoke the first application programming interface (API) to send a request message to the storage device. The first API may be a newly added API, or may exist in a form of an API of a communication protocol.

The function of managing the storage device 200 by the application server 100 may be represented in a plurality of different aspects, for example, configuration of the working mode, setting of the priority, delivery of the computing task, and monitoring of the hard disk. The foregoing aspects related to the management function are merely examples. The function of managing the storage device 200 by the application server 100 mentioned in this embodiment of this application is not limited to the foregoing aspects.

For ease of understanding, the user management module 110 is split into a plurality of submodules, and each submodule implements the management function in one aspect. As shown in FIG. 2, the user management module 110 includes a control submodule 111, a user submodule 112, a computing submodule 113, and a management submodule 114. These submodules may alternatively be deployed on the application server 100 in a form of an API, and are invoked by the application server 100 in the form of the API.

1. Control Submodule 111

The control submodule 111 is configured to implement the configuration of the working mode. The application server 100 may configure the working mode of the storage device 200 by using the control submodule 111. The working mode of the storage device 200 describes a policy that needs to be followed when the storage device 200 processes the data access request.

The storage device 200 have different quantities of data access requests processed in different phases, and also have different processing requirements of different data requests in different phases.

For example, for all storage devices 200 on a video platform, the storage devices 200 store a plurality of videos on the video platform. Usually, time segments in which video platform users are active on workdays are a noon time segment and a night time segment. In the two time segments, users browse videos by logging in to client software. In this case, the client software triggers a device where the client software is located to initiate a data access request to the storage device 200, to obtain the videos stored in the storage device 200. The storage device 200 processes a large quantity of data access requests in the two time segments. However, in a morning time segment and an afternoon time segment, activeness of the video platform users is low, and data access requests processed by the storage device 200 in the two time segments gradually decrease. Therefore, the storage device 200 needs to be capable of efficiently processing the data access requests in the time segments in which the users are active. In the time segments in which the user activeness is low, the storage device 200 may reduce power consumption and reduce resource consumption.

A file management platform is used as an example. The file management platform stores a file of a user in the storage device 200, manages the file of the user, and performs, based on a requirement of the user, an operation such as adding, deleting, querying, or modifying the file stored in the storage device 200. When the user needs to view the file, the user initiates, by using a file management application running on the application server 100, a data access request used to request the file. After receiving the data access request, the storage device 200 may feed back the file to the application server 100. Compared with another operation such as adding, deleting, or modifying, an operation of viewing the file has a higher latency requirement, and the storage device 200 needs to be capable of quickly feeding back the file.

It can be learned that, the storage device 200 needs to have different working modes in different phases, to match processing requirements of the data access request in different phases, for example, a response speed (where the response speed may be understood as a latency of processing the data access request by the storage device 200).

There are a plurality of types of working modes. In this embodiment of this application, only the possible working modes are listed. During actual application, different working modes may be added according to an actual scenario. The working mode includes but is not limited to: a peak performance mode (peak mode), a power consumption mode (power mode), a latency mode (latency priority), and an endurance mode (endurance mode).

In the peak mode, the storage device 200 needs to have an efficient data processing capability, and input/output operations per second (IOPS) or a throughput of the storage device 200 needs to exceed a threshold.

In the power mode, the storage device 200 needs to ensure that power consumption of the storage device 200 meets a specific power consumption requirement. For example, the storage device 200 may ensure that the power consumption of the storage device 200 is less than a power consumption threshold. In this case, the storage device 200 is in a low power mode, and this effectively saves resources in the storage device 200. The storage device 200 may alternatively ensure that the power consumption of the storage device 200 is greater than the power consumption threshold.

In this case, the storage device 200 is in a high power mode, so that the storage device 200 can run efficiently.

In the latency priority, a latency of processing the data access request by the storage device 200 needs to meet a specific latency requirement. For example, the storage device 200 may ensure that the latency of processing the data access request by the storage device 200 is less than a latency threshold. In this case, the storage device 200 is in a high latency priority and can quickly access data and feed back the data to the application server 100 in a short time period. The storage device 200 may ensure that the latency of processing the data access request by the storage device 200 is greater than the latency threshold. In this case, the storage device 200 is in a low latency priority, which is applicable to a scenario in which the storage device 200 does not need to access data quickly and has a low requirement on time for feeding back the data to the application server 100.

In the endurance mode, a service life expectancy of the storage device 200 needs to meet a specific service life requirement. The service life expectancy is time during which the storage device 200 can be used normally and that is calculated based on a current consumption speed of a component of the storage device 200. The current consumption speed of the component includes but is not limited to: bandwidth of the hard disk, processor usage, and background operation frequency of the hard disk. For example, the storage device 200 may ensure that the service life expectancy calculated based on the consumption speed of the component of the storage device 200 is greater than a service life threshold. In this case, the storage device 200 is in a high endurance mode. In this mode, the storage device 200 needs to control the consumption speed of the internal component as much as possible, for example, control consumption of the hard disk. For another example, the storage device 200 may ensure that the service life expectancy calculated based on the consumption speed of the component of the storage device 200 is less than a service life threshold. In this case, the storage device 200 is in a low endurance mode. In this mode, the storage device 200 may not consider the consumption speed of the internal component, and this improves efficiency of processing the data access request.

The application server 100 may invoke the control submodule 111 to generate a configuration request used to configure the working mode. The configuration request includes but is not limited to:

- a configuration request for configuring the peak mode, for example, set_peak_mode (=1);
- a configuration request for configuring the power mode, for example, set_power_mode (=high or low);
- a configuration request for configuring the endurance mode, for example, set_endurance_mode (=high or low); and
- a configuration request for configuring the latency priority, for example, set_latency_priority (=high or low).

The application server 100 may invoke the first API to send the configuration request to the storage device.

2. User Submodule 112

The user submodule 112 is configured to set the priority. In this embodiment of this application, the priority of the data access request is the priority of processing the data access request by the storage device 200. The application server 100 may configure the priority by using the user submodule 112.

The priority setting implemented by the user submodule 112 includes priority settings of different granularities. For example, the user submodule 112 may set priorities for data access requests initiated by different applications; the user submodule 112 may set priorities for data access requests initiated by different users; and the user submodule 112 may set priorities for data access requests initiated by users of different service levels.

The user is an account that triggers a data access request. The user may be an individual user or an enterprise-level user. Different priorities may be set for different users. The application may be client software that can be operated by the user, such as file management software and database software. The service level is used to describe a processing requirement of the user for the data access request. For example, a higher service level indicates a higher requirement of the user on a latency of the data access request.

There are a plurality of priority representation manners. For example, the application server 100 and the storage device 200 may use values to represent priorities of different data access requests initiated by different applications, and the priorities are respectively 1, 2, 3, 4, and so on in descending order. For another example, the application server 100 and the storage device 200 may use English to represent different priorities of data access requests initiated by different customers, and the priorities are respectively Ex (extreme high priority), Ui (ultra high priority), Ge (general priority), and so on in descending order. Ex represents a highest priority, Ui represents a higher priority, and Ge represents a normal priority. The priority representation manner is not limited in this embodiment of this application.

The user submodule 112 may set the priority in a plurality of manners. The user submodule 112 may set priorities of only some data access requests. For example, the application server 100 may invoke the user submodule 112 to set priorities of data access requests initiated by some applications, users of some service levels, or some users. The user submodule 112 may alternatively set priorities of all data access requests. For example, the application server 100 may alternatively invoke the user submodule 112 to set priorities of data access requests initiated by all applications, users of all service levels, or all users.

It should be noted that the priority set by the user submodule 112 is not fixed, and the user submodule 112 may dynamically adjust the priority, and set priorities of some or all data access requests.

The application server 100 may invoke the user submodule 112 to generate a setting request for setting the priority. The setting request includes but is not limited to:

- a setting request used to initialize the priority, for example, Init (priority table [user, app, level]), where user indicates a user, app indicates an application, and level indicates a priority, for example, a number or an English identifier indicates a priority; and
- a setting request used to update the priority, for example, update (priority tabe[user, app, level]).

To enable the storage device 200 to process the data access request based on the priority, after the data access request from the client device 300 is processed by the user submodule 112, the data access request carrying identification information is generated. The data access request carrying the identification information includes but is not limited to:

- a data read request used to read data, where the data read request carries some identification information for identifying the priority, for example, Read IO (info [user, app, address, etc.]), where Read IO indicates that the data access request is a data read request, info indicates information that can be carried in the data read request, the information carried in the data read request may include information in square brackets, user indicates a user, app indicates an application, and address is used to identify an address of the client device 300; and a data write request used to write data, where the data write request carries some identification information for identifying the priority, for example, Write IO (info [user, app, address, etc.]), where Write IO indicates that the data access request is a data write request. For descriptions of info, user, app, and address, refer to the foregoing descriptions. Details are not described herein again.

The application server 100 may invoke the first API to send the setting request and the data access request to the storage device.

3. Computing Submodule 113

The computing submodule 113 is configured to deliver the computing task. The application server 100 may deliver the computing task to the storage device 200 by using the computing submodule 113, to indicate the storage device 200 to execute the computing task. The computing submodule 113 may further obtain, from the storage device 200, a computation result of the executed task.

The computing task may be sent by a user to the application server 100 by using the client device 300. After receiving the computing task, the application server 100 may parse the computing task. If a workload of the computing task is heavy and exceeds a specific threshold, or data related to the computing task is distributed in different storage devices 200, the application server 100 may decompose the computing task, to further decompose the computing task into a plurality of small computing tasks. The application server 100 may distribute these small computing tasks to a plurality of storage devices 200, and one storage device 200 may undertake one or more small computing tasks.

After decomposing the computing task, the computing submodule 113 may send a computation request to the storage device 200, to deliver the computing task. The computation request includes a data computing range and a computing indication. The data computing range may indicate data that needs to participate in the computing task, and the computing indication indicates a data computing manner.

In this embodiment of this application, the computing task includes but is not limited to: data search, data computing, data migration, data sorting, data compression, and data encoding/decoding.

The data search refers to searching a part or all of data in the storage device 200 for data that meets a target requirement. In the computing task such as the data search, the computing submodule 113 needs to be capable of notifying the storage device 200 of a data search range (which may be understood as the data computing range) and the target requirement. In this type of computing task, the computing indication represents that the data that meets the target requirement is searched for. The data search range refers to the data for which the data search is performed. In other words, the storage device 200 needs to be indicated to search a part of the data or search all of the data. When a part of the data is searched, specific data of the part of the data needs to be indicated.

The data computing refers to performing a function operation on all or a part of the data stored in the storage device 200. The computing submodule 113 needs to be capable of notifying the storage device 200 of a computing range (which may be understood as the foregoing data computing range) and a function. In the computing task, the computing indication represents that the function operation is performed on the data. The computing range indicates the data on which the data computing is performed. In other words, the storage device 200 needs to be indicated to perform data computing on a part of the data or perform data computing on all of the data. When a part of the data is computed, specific data of the part of the data needs to be indicated. The function is a computing manner used for the part or all of the data during data computing.

The data migration refers to migrating a part or all of the data in the storage device 200 from an original address to a destination address. The computing submodule 113 needs to notify the storage device 200 of the original address (which may be understood as the data computing range) and the destination address, and the computing indication represents that the data needs to be migrated to the destination address.

The data sorting refers to sorting a part or all of the data in the storage device 200 based on a sorting requirement. In the computing task such as the data sorting, the computing submodule 113 needs to notify the storage device 200 of a data sorting range (which may be understood as the data computing range) and the sorting requirement. In this type of computing task, the computing indication represents that sorting is performed based on the sorting requirement. The data sorting range indicates the data that needs to be sorted.

The data compression refers to compressing a part or all of the data in the storage device 200. In the computing task such as the data compression, the computing submodule 113 needs to notify the storage device 200 of a data compression range (which may be understood as the data computing range), and the computing indication indicates that the data needs to be compressed. Optionally, the computing submodule 113 may further notify the storage device 200 of a compression manner that needs to be used for the data compression. The data compression range indicates the data that needs to be compressed.

The data encoding/decoding refers to encoding or decoding a part or all of the data in the storage device 200. In the computing task such as the data encoding/decoding, the computing submodule 113 needs to notify the storage device 200 of a data encoding/decoding range (which may be understood as the data computing range), and the computing indication indicates that encoding/decoding needs to be performed on the data. Optionally, the computing submodule 113 may further notify the storage device 200 of an encoding manner that needs to be used for the data encoding or notify the storage device 200 of a decoding manner that needs to be used for the data decoding. The data encoding/decoding range indicates the data that needs to be encoded or decoded.

The application server 100 may invoke the computing submodule 113 to generate the computation request indicating the computing task. The computation request includes but is not limited to:

a computation request for performing computation on data, for example, exec_compute_task(user, function, address, result), where compute_task indicates that the computing task is data computing, user indicates a user, function indicates a function that needs to be used for the data computing, address is a data address and indicates the data computing range, and result is a computation result and is used to notify the storage device 200 that a computation result needs to be fed back;

a computation request for searching for data, for example, exec_search(user, address, target, return), where search indicates that a type of the computing task is data search, address is a data address and indicates the data search range, target is a target and indicates a target requirement, and return is a feedback and is used to notify the storage device 200 that a search result needs to be fed back; and a computation request for migrating data, for example, exec_data_move(user, source addr, destination addr), where data_move indicates that a type of the computing task is data migration, user indicates a user, source addr is an original address, and destination addr is a destination address.

The application server 100 may invoke the first API to send the computation request to the storage device.

4. Management Submodule 114

The management submodule 114 is configured to monitor the hard disk in the storage device 200. The application server 100 may obtain a working status of the hard disk in the storage device 200 by using the management submodule 114.

The monitoring performed by the management submodule 114 on the hard disk in the storage device 200 may be coarse-grained monitoring. The coarse-grained monitoring refers to monitoring an overall working status of all hard disks in the storage device 200, for example, monitoring overall bandwidth of all the hard disks in the storage device 200, a quantity of normal hard disks that work normally and a quantity of faulty hard disks in all the hard disks, a hard disk service life (where the hard disk service life may be understood as hard disk program-erase cycles), a hard disk error condition (where a hard disk error refers to an error generated when the hard disk reads and writes data), hard disk read/write latency distribution (where the hard disk latency distribution refers to a latency of data read/write in a time period), and an average value of latencies of all the hard disks in the storage device 200. The bandwidth of the hard disk refers to a data throughput, and refers to an amount of data that can be successfully transmitted in a unit time. The latency of the hard disk refers to time for the hard disk to access data. When the monitoring performed by the management submodule 114 on the storage device 200 is the coarse-grained monitoring, after receiving a monitoring request sent by the management submodule 114, the storage device 200 may obtain a working status of each hard disk, summarize the working status of each hard disk, and report the overall working status to the application server 100. An operation performed by the storage device 200 in the coarse-grained monitoring is described below, and details are not described herein again.

The monitoring performed by the management submodule 114 on the hard disk in the storage device 200 may alternatively be fine-grained monitoring. The fine-grained monitoring refers to monitoring a working status of one or more hard disks in the storage device 200, for example, monitoring bandwidth of one or more hard disks in the storage device 200, whether one or more hard disks are normal or faulty, and a latency of one or more hard disks in the storage device 200.

The application server 100 may invoke the management submodule 114 to generate a monitoring request used to monitor the working status of the hard disk. The monitoring request includes but is not limited to:

a monitoring request for monitoring bandwidth of the hard disk, for example, get_ssd_bw(ssd_name), where bw is bandwidth (bandwidth), ssd_name is an identifier of an SSD and indicates a hard disk that needs to be monitored, and when ssd_name is missing, it may be considered that the bandwidth requested by the monitoring request is overall bandwidth of all the hard disks;

a monitoring request for monitoring whether the hard disk works, for example, get_stat_info(ssd_name), where info is information and herein is used to represent information about the hard disk that needs to be monitored, such as bandwidth and a service life, stat is a state (state), ssd_name is an identifier of an SSD and indicates the hard disk that needs to be monitored, and when ssd_name is missing, it may be considered that information requested by the monitoring request is working information of all the hard disks, for example, whether all the hard disks work normally, and a quantity of hard disks that work normally; and a monitoring request for monitoring whether the hard disk is faulty, for example, get_error_info(ssd_name), where ssd_name is an identifier of an SSD and indicates the hard disk that needs to be monitored, and when ssd_name is missing, it may be considered that information requested by the monitoring request is fault information of all the hard disks, for example, whether all the hard disks are faulty, and a quantity of faulty hard disks.

The application server 100 may invoke the first API to send the monitoring request to the storage device.

It should be noted that the submodules included in the user management module 110 are merely examples. In an actual application scenario, a quantity of submodules included in the user management module 110 and functions of the submodules are not limited to the foregoing submodules. During specific application, a submodule having a corresponding function may be added, or a related function may be added to a submodule based on an actual requirement.

II. Storage Device 200

In this embodiment of this application, the storage device 200 is a device that has both a computing capability and a storage capability. The storage device 200 may be a server, a desktop computer, or the like. A deployment location of the storage device 200 is not limited in this embodiment of this application. The storage device 200 may be deployed on a cloud, for example, deployed in an edge data center, or may be deployed in a central cloud data center.

The storage device 200 may receive a request message from the application server 100, process the request message, and perform a corresponding operation based on the request message. The request message includes a data access request and a management request. The storage device 200 may access data stored in the storage device 200 based on the data access request. The storage device 200 may process the management request to manage the storage device 200 by the application server 100. For example, the storage device 200 may configure a working mode of the storage device 200 based on a configuration request, monitor a status of the hard disk in the storage device 200 based on a monitoring request, execute a computing task based on a computation request, or set a priority of the data access request based on a setting request.

Alternatively, the storage device 200 may spontaneously manage the storage device 200. For example, the storage device 200 may configure a working mode, set a priority for processing the data access request, and monitor a status of the hard disk in the storage device 200 based on a current scenario.

Figure 3:
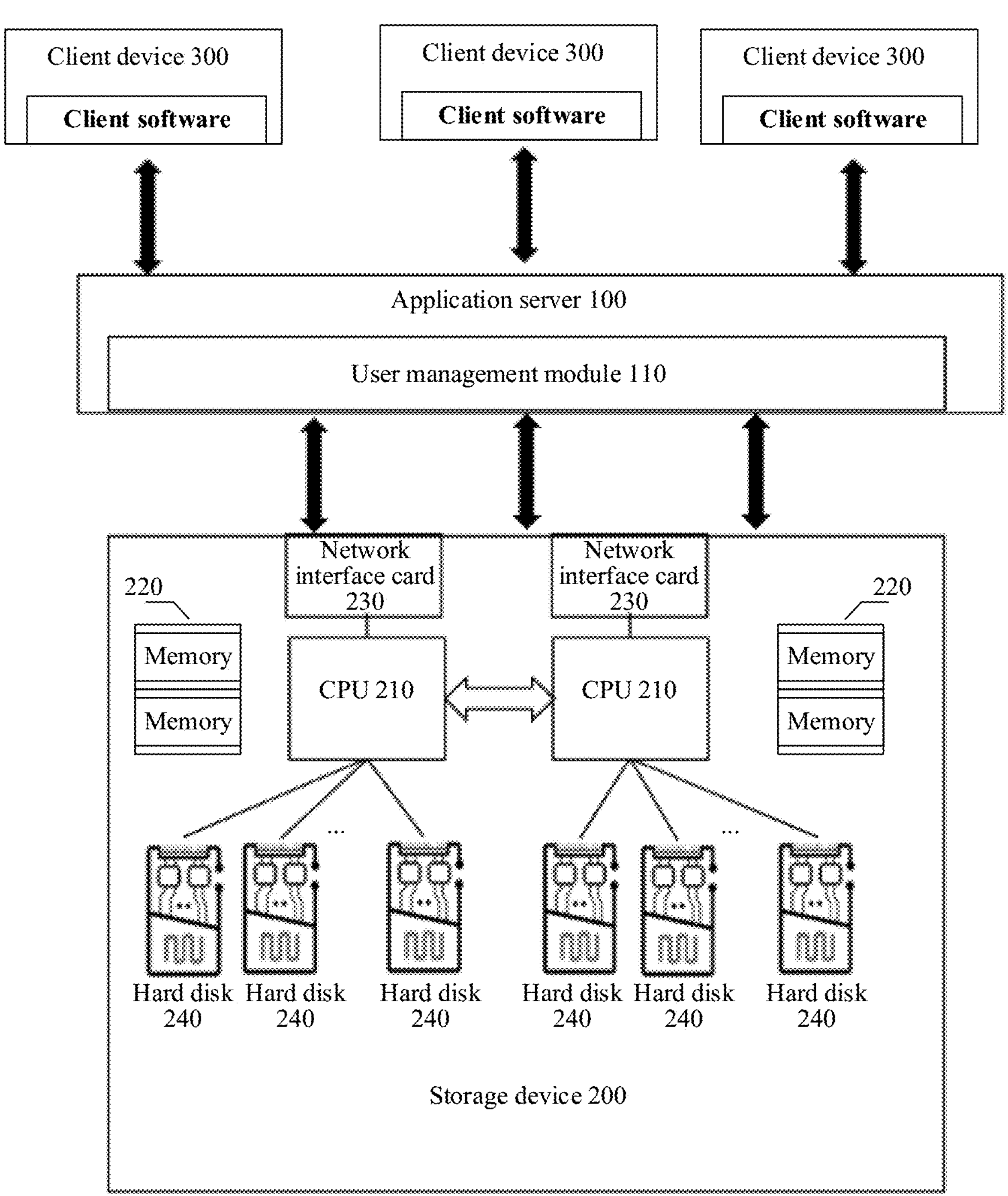
FIG. 3 is a schematic diagram of a structure of a storage device according to this application.

In terms of hardware, as shown in FIG. 3, the storage device 200 includes at least one processor 210, a memory 220, a network interface card 230, and a hard disk 240. The processor 210, the memory 220, the network interface card 230, and the hard disk 240 are connected through a bus. The processor 210 and the memory 220 are configured to provide a computing resource. Specifically, the processor 210 is a central processing unit (CPU). FIG. 3 shows only two CPUs. A quantity of CPUs is not limited in this embodiment of this application, and there may be one or more CPUs.

The memory 220 refers to an internal storage that directly exchanges data with the processor 210. The memory 220 can read and write data at a high speed at any time, and serves as a program instruction storage of a storage operating system or another running program. The memory 220 includes at least two types of storages. For example, the memory 220 may be a random access memory, for example, a dynamic random access memory (DRAM) or a storage class memory (SCM), or may be a read-only memory (ROM). The memory 220 may further include another random access memory, for example, a static random access memory (SRAM). The memory 220 may alternatively be a dual-line memory module (DIMM).

The hard disk 240 is configured to provide a storage resource, for example, store data. The hard disk 240 may be a magnetic disk or another type of storage medium, for example, a solid-state drive (solid-state drive, SSD) 240 or a stacked magnetic recording hard disk 240.

In this embodiment of this application, an example in which the hard disk 240 is the solid-state drive 240 is used for description. A reserved field in an interface protocol of the solid-state drive 240 is configured, or a proprietary protocol is customized for the solid-state drive 240, so that the solid-state drive 240 can identify a custom command and process the custom command. The custom command herein is a command that needs to be delivered to the solid-state drive 240 when the storage device 200 processes a management request (such as a monitoring request, a configuration request, a setting request, or a computation request) from the application server 100. The command is a command other than a normal data read/write command. Descriptions of the custom command are described in detail below. The interface protocol includes but is not limited to: a non-volatile memory express (NVMe) protocol, a serial advanced technology attachment (SATA) protocol, and a peripheral component interconnect express (PCIe) protocol.

In this embodiment of this application, to match the working mode of the storage device 200, a corresponding working mode may also be set for the solid-state drive 240. For example, the working mode of the storage device 200 includes a peak mode, a power mode, a latency priority, and an endurance mode. The solid-state drive 240 may also set the peak mode, the power mode, the latency priority, and the endurance mode of the solid-state drive 240, to correspond to different working modules of the storage device 200. The peak mode, the power mode, the latency priority, and the endurance mode of the solid-state drive 240 are similar to the peak mode, the power mode, the latency priority, and the endurance mode of the storage device 200, and details are not described herein again.

The network interface card 230 is configured to communicate with the application server 100. The network interface card 230 may receive a request message from the application server 100. When the network interface card 230 has a data processing function, for example, the network interface card 230 is an intelligent network interface card 230, the network interface card 230 may also replace the processor 210 to perform some processing operations.

In this embodiment of this application, for the request message from the application server 100, the processor 210 inside the storage device 200 may process the request message, and the network interface card 230 only forwards the request message to the processor 210. In this processing manner, the processor 210 invokes program instructions in the memory 220 to process the request message. Alternatively, the network interface card 230 inside the storage device 200 may parse and process the request message. In this processing manner, the request message is not transmitted to the processor 210, so that occupation of the processor 210 can be reduced. Alternatively, the network interface card 230 and the processor 210 inside the storage device 200 may cooperate to process the request message. For example, the network interface card 230 may process the data access request, and forward the data access request to the hard disk 240, to implement data access. The processor 210 processes a request message (that is, a management request) other than the data access request, for example, a configuration request, a control request, a computation request, and a setting request.

Figure 4:
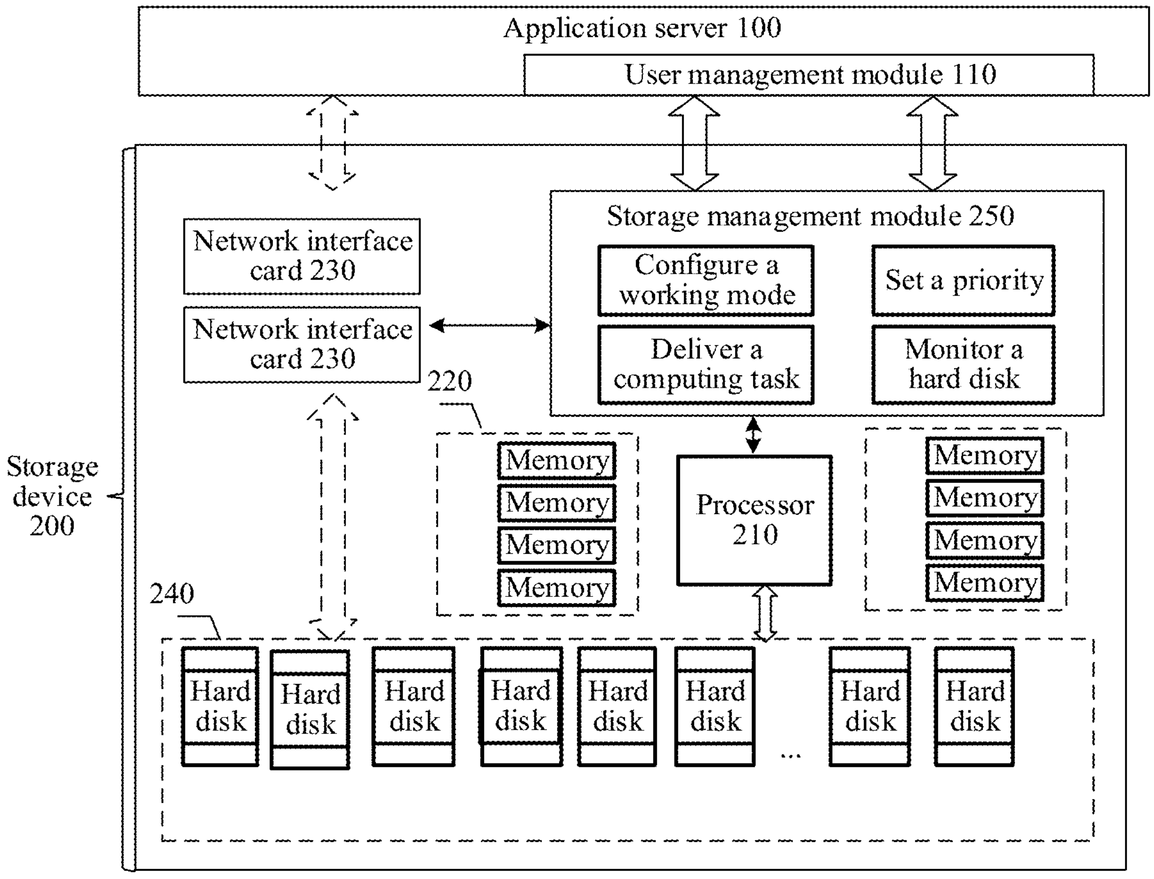
FIG. 4 is a schematic diagram of interaction between an application server and a storage device according to this application.

As shown in FIG. 4, a storage management module 250 is deployed in the storage device 200. The storage management module 250 may be understood as a software module running on the storage device. A location at which the software module is deployed in the storage device 200 is not limited in this embodiment of this application. For example, the storage management module 250 may be deployed on the network interface card 230, and the network interface card 230 inside the storage device 200 processes the request message from the application server 100. For another example, the storage management module 250 may be deployed on the processor 210, and the processor 210 inside the storage device 200 processes the request message from the application server 100. For another example, if the storage management module 250 is partially deployed on the processor 210, and partially deployed on the network interface card 230, the network interface card 230 and the processor 210 cooperate to process the request message.

A second API is further configured on the storage device 200. The second API is configured to implement interaction with the hard disk. The storage device 200 may invoke the second API to send a custom command (such as a monitoring command or a configuration command) or a command generated based on the data access request to the storage device. The second API may be a newly added API, or may exist in a form of an API of a communication protocol (for example, the NVMe protocol).

Because the storage management module 250 is deployed at different locations, hardware components for processing the request message in the storage device 200 are also different. For ease of description, the following describes a manner in which the storage device 200 processes the request message by using the storage management module 250 as an execution body. It should be understood that, when the storage management module 250 processes the request message, actually, hardware in which the storage management module 250 is located processes the request message.

For different types of request messages, the storage management module 250 processes the request messages in different manners.

1. Data Access Request

After receiving the request message, the storage management module 250 parses the request message, and determines that the request message is a data access request.

For a data write request used to request to write data, the storage management module 250 selects a target hard disk 240 from the hard disk 240 based on a status of the hard disk 240 in the storage device 200. The storage management module 250 sends the data write request to the target hard disk 240, and the target hard disk 240 processes the data write request and writes the data into the target hard disk 240. For example, the storage management module 250 may select a hard disk 240 with light load as the target hard disk 240, and send the data write request to the target hard disk 240.

For a data read request used to request to read data, the storage management module 250 determines, based on a data address carried in the data read request, a hard disk 240 in which the data that needs to be read is located, and sends the data read request to the determined hard disk 240. The hard disk 240 processes the data read request, reads the data from the data address, and feeds back the read data to the storage management module 250. After obtaining the data fed back by the hard disk 240, the storage management module 250 sends the data to the application server 100.

2. Management Request

After receiving a request message, the storage management module 250 parses the request message, and determines that the request message is a management request. For different types of management requests, the storage management module 250 may perform corresponding operations based on the management requests. The following lists several processing manners for the management requests.

(1) Configuration Request, Used to Request to Configure a Working Mode

When receiving a configuration request used to request to configure a working mode, the storage management module 250 may switch, based on the configuration request, a working mode of the storage management module 250 into the working mode indicated by the configuration request.

When switching, based on the configuration request, the working mode of the storage management module 250 to the working mode indicated by the configuration request, the storage management module 250 may adjust a status of each component in the storage device 200, to meet a requirement of the working mode indicated by the configuration request.

When the configuration request is used to request to configure the working mode as a peak mode, the storage management module 250 may switch the working mode to the peak mode. For example, the storage management module 250 may send a configuration command to the hard disk through the second API, suspend all background operations of the hard disk 240, and release bandwidth of the hard disk 240. The storage management module 250 may further send a configuration command to the hard disk through the second API, and increase clock frequency of the hard disk 240, so that the storage device 200 achieves maximum performance. The manners herein are merely examples, and all manners that can improve the performance of the storage device 200 are applicable to this embodiment of this application.

When the configuration request is used to request to configure the working mode as a low power mode, the storage management module 250 may switch the working mode to the low power mode. For example, the storage management module 250 may adjust the status of the component in the storage device 200, to reduce power consumption of the component (such as the processor or the memory) in the storage device 200. The storage management module 250 may further send a configuration command to the hard disk through the second API, suspend all background operations of the hard disk 240, and reduce power consumption of the hard disk, so that the storage device 200 has low power consumption. The manners herein are merely examples, and all manners that can reduce the power consumption of the storage device 200 are applicable to this embodiment of this application. When the configuration request is used to request to configure the working mode as a high power mode, a manner in which the storage management module 250 may switch the working mode to the high power mode is opposite to the foregoing manner in which the working mode is switched to the low power mode.

When the configuration request is used to request to configure the working mode as a high latency priority, the storage management module 250 may switch the working mode to the high latency priority. For example, the storage management module 250 may adjust a status of the component in the storage device 200, to improve processing efficiency of the component (such as the processor or the memory) in the storage device 200. The storage management module 250 may further send a configuration command to the hard disk through the second API, and suspend all background operations of the hard disk 240, to ensure that the hard disk 240 can accelerate data access. The manners herein are merely examples, and all manners that can reduce a latency of the storage device 200 are applicable to this embodiment of this application. When the configuration request is used to request to configure the working mode as a low latency priority, a manner in which the storage management module 250 may switch the working mode to the low latency priority is opposite to the foregoing manner in which the working mode is switched to the high latency priority.

When the configuration request is used to request to configure the working mode as a high endurance mode, the storage management module 250 may switch the working mode to the high endurance mode. For example, the storage management module 250 may adjust a status of the component in the storage device 200, for example, reduce processing efficiency of the processor, reduce a quantity of read/write times of the memory, and prolong a service life of the component (such as the processor or the memory) in the storage device 200. The storage management module 250 may further send a configuration command to the hard disk through the second API, reduce frequency of all background operations of the hard disk 240, and reduce bandwidth of the hard disk 240, to prolong a service life of the hard disk 240. The manners herein are merely examples, and all manners that can prolong the service life of the storage device 200 are applicable to this embodiment of this application. When the configuration request is used to request to configure the working mode as a low endurance mode, a manner in which the storage management module 250 may switch the working mode to the low endurance mode is opposite to the foregoing manner in which the working mode is switched to the high endurance mode.

For the hard disk 240, the storage management module 250 may accurately control a status of the hard disk 240 in the foregoing manners. When each working mode that matches the storage device 200 is set for the hard disk 240, the storage management module 250 may also send a configuration command to the hard disk 240 through the second API, where the configuration command indicates the hard disk 240 to configure the working mode.

For example, when the configuration request is used to request to configure the working mode as the peak mode, the storage management module 250 may send a configuration command to the hard disk 240 through the second API, where the configuration command may indicate the hard disk 240 to configure the working mode as the peak mode. After receiving the configuration command, the hard disk 240 may identify the configuration command, and switch the working mode of the hard disk 240 to the peak mode.

For the peak mode of the hard disk 240, the hard disk 240 may switch the working mode to the peak mode, for example, suspend a background operation of the hard disk 240, and release bandwidth of the hard disk 240, so that the hard disk 240 achieves maximum performance. The manners herein are merely examples, and all manners that can improve the performance of the hard disk 240 are applicable to this embodiment of this application.

For the low power mode of the hard disk 240, the hard disk 240 may switch the working mode to the low power mode. For example, the hard disk 240 may suspend some background operations of the hard disk 240 or reduce frequency of background operations (where the background operation refers to an operation other than data access, such as garbage collection), and reduce power consumption of the hard disk. The manners herein are merely examples, and all manners that can reduce the power consumption of the hard disk 240 are applicable to this embodiment of this application. For the high power mode of the hard disk 240, a manner in which the hard disk 240 may switch the working mode to the high power mode is opposite to the foregoing manner in which the working mode is switched to the low power mode.

For the high latency priority of the hard disk 240, the hard disk 240 may switch the working mode to the high latency priority, for example, suspend a background operation of the hard disk 240, to ensure that the hard disk 240 can accelerate data access. The manners herein are merely examples, and all manners that can reduce a latency of the hard disk 240 are applicable to this embodiment of this application. For the low latency priority of the hard disk 240, a manner in which the hard disk 240 may switch the working mode to the low latency priority is opposite to the foregoing manner in which the working mode is switched to the high latency priority.

For the high endurance mode of the hard disk 240, the hard disk 240 may switch the working mode to the high endurance mode, for example, reduce frequency of background operations of the hard disk 240, or reduce bandwidth of the hard disk 240, to prolong a service life of the hard disk 240. The manners herein are merely examples, and all manners that can prolong the service life of the hard disk 240 are applicable to this embodiment of this application. For the low endurance mode of the hard disk 240, a manner in which the hard disk 240 may switch the working mode to the low endurance mode is opposite to the foregoing manner in which the working mode is switched to the high endurance mode.

(2) Setting Request, Used to Request to Set a Priority of Processing a Data Access Request by the Storage Device 200

The storage device 200 may store a priority list, and the priority list records priorities for different users, clients, or applications. The priority list may be stored in the memory 220 of the storage device 200, or may be stored in the network interface card 230.

When receiving the setting request used to request to set the priority of processing the data access request by the storage device 200, the storage management module 250 may update the priority list based on the setting request, for example, adjust priorities for different users, users of different service levels, or different applications in the priority list based on the setting request, add a priority for a new user, a user of a service level, or an application in the priority list based on the setting request, or delete a priority for a user, a user of a service level, or an application in the priority list based on the setting request.

The storage management module 250 may process received data access requests based on an updated priority list. When processing the received data access requests based on the updated priority list, the storage management device may sequentially process the data access requests based on the priority list. For a data access request with a high priority, the storage management module 250 may insert, through the second API, a command generated based on the data access request into a front location in a submission queue of the hard disk. The storage management module 250 may further add a priority identifier to the command before placing the command generated based on the data access request to the submission queue of the hard disk, where the priority identifier represents a priority of the command. The storage management module 250 places the command to which the priority identifier is added to the submission queue of the hard disk. When placing the command, the storage management module 250 may insert the command into the front location in the submission queue of the hard disk through the second API, or may place the command at the end of the submission queue of the hard disk through the second API. For the hard disk, the hard disk can identify a priority identifier added to each command in the submission queue. The hard disk extracts the command to which the priority identifier is added from the submission queue, may identify the priority identifier to determine a priority of each command, and process each command based on the priority. Alternatively, the storage management module 250 and the hard disk 240 may preconfigure command formats of different priorities, that is, command formats of different priorities are different. The storage management module 250 may generate a command of a corresponding priority based on the priority of the data access request, and insert the command into the submission queue of the hard disk. For the hard disk, the hard disk can determine the priority of the command by identifying the command format, and process each command based on the priority.

(3) Computation Request, Used to Deliver a Computing Task

When receiving a computation request used to deliver a computing task, the storage management module 250 may execute the computing task based on the computation request. The storage management module 250 may parse the computation request, determine a data computing range indicated by the computation request, determine a hard disk 240 in which data indicated by the data computing range is located, and send a data read command to the hard disk 240, where the data read command is used to request to read the data indicated by the data computing range. If the data indicated by the data computing range is distributed in a plurality of hard disks 240, the storage management module 250 may send the data read command to the plurality of hard disks 240, to request the data in the data computing range.

After obtaining, from the hard disk 240, the data indicated by the data computing range, the storage management module 250 may compute, based on a computing indication carried in the computation request, the data indicated by the data computing range, generate a computation result, and feed back the computation result to the application server 100.

For example, the computation request is exec_search (user, address, target, return), and the computing task delivered by using the computation request is data search. The storage management module 250 determines, based on a data address, one or more hard disks 240 in which the data is located, and sends a data read command to the one or more hard disks 240. After receiving the data fed back by the hard disk 240, the storage management module 250 determines, based on a target requirement, whether data meeting the target requirement exists in the data, and the data meeting the target requirement, and feeds back a search result (for example, whether the data meeting the target requirement exists and the data meeting the target requirement) to the application server 100.

In a possible implementation, the storage management module 250 parses the computation request, to determine the hard disk 240 in which the data indicated by the data computing range is located. The data read command sent by the storage management module 250 to the hard disk 240 may also carry the computing indication. In this way, when receiving the data read command that carries the computing indication, the hard disk 240 may process the data based on the computing indication, and feed back the data to the storage device 200.

(4) Monitoring Request, Used to Request to Monitor the Hard Disk 240 of the Storage Device 200

When receiving a monitoring request used to monitor the hard disk 240 of the storage device 200, the storage management module 250 may monitor a working status of the storage device 200 based on the monitoring request.

When monitoring on the hard disk 240 in the storage device 200 is coarse-grained monitoring, the monitoring request is used to request to monitor, for example, overall bandwidth of all hard disks 240 in the storage device 200, a quantity of hard disks 240 that work normally in all the hard disks 240, a quantity of faulty hard disks 240, an average service life of the hard disks 240 (where the average service life of the hard disks 240 may be understood as an average value of service lives of all the hard disks 240), an average error condition of the hard disks 240 (where the average error condition of the hard disks 240 is an average value of error conditions of all the hard disks 240), and an average latency value of all the hard disks 240 in the storage device 200.

The storage management module 250 may separately send a monitoring command to each hard disk 240 through the second API, to obtain bandwidth of each hard disk 240, whether each hard disk 240 works normally, a service life of each hard disk 240, an error condition of each hard disk 240, and a latency of each hard disk 240. When receiving the monitoring command, the hard disk 240 may feed back information such as the bandwidth of the hard disk 240, normal working of the hard disk 240, the service life of the hard disk 240, the error condition of the hard disk 240, and the latency of the hard disk 240. After receiving information fed back by the hard disks 240, the storage management module 250 may summarize the information fed back by the hard disks 240, and send the summarized information to the application server 100. The monitoring command is a custom command.

For example, when the application server 100 needs to monitor the overall bandwidth of all the hard disks 240 in the storage device 200, the storage management module 250 may sum the bandwidth of all the hard disks 240 to obtain the overall bandwidth of all the hard disks 240, and feed back the overall bandwidth of all the hard disks 240 to the application server 100.

For another example, when the application server 100 needs to monitor the quantity of normal hard disks 240 or the quantity of faulty hard disks 240 in the storage device 200, the storage management module 250 may send a monitoring command to each hard disk 240, where the monitoring command is used to request the hard disk 240 to report whether the hard disk 240 works normally. If the hard disk 240 can work normally, the hard disk 240 may parse the monitoring command, and send a response message to the storage management module 250, where the response message indicates that the hard disk 240 works normally. If the hard disk 240 is faulty, the hard disk 240 cannot receive or parse the monitoring command, and may not send any message to the storage management module 250. If the storage management module 250 does not receive a response message from the hard disk 240, it is considered that the hard disk 240 is faulty. The storage management module 250 may collect statistics on hard disks 240 that send a response message, and determine the hard disks 240 that can work normally and a quantity of hard disks 240 that work normally. The storage management module 250 may collect statistics on hard disks 240 that do not send a response message, determine the faulty hard disks 240 and a quantity of faulty hard disks 240, and feed back the quantity of hard disks 240 that work normally or the quantity of faulty hard disks 240 to the application server 100.

When monitoring on the hard disk 240 in the storage device 200 is fine-grained monitoring, the monitoring request is used to monitor, for example, bandwidth of one or more hard disks 240 in the storage device 200, whether one or more hard disks 240 are normal or faulty, a latency of one or more hard disks 240 in the storage device 200, a service life of one or more hard disks 240, an error condition of one or more hard disks 240, and read/write latency distribution of one or more hard disks 240.

The storage management module 250 may separately send a monitoring command to the one or more hard disks 240 through the second API, to obtain bandwidth of each hard disk 240, whether each hard disk 240 works normally, a service life of each hard disk 240, an error condition of each hard disk 240, read/write latency distribution of each hard disk 240, and a latency of each hard disk 240. When receiving the monitoring command, the hard disk 240 may feed back information such as the bandwidth of the hard disk 240, normal working of the hard disk 240, the service life of the hard disk 240, the error condition of the hard disk 240, the read/write latency distribution of the hard disk 240, and the latency of the hard disk 240. After receiving the information fed back by each hard disk 240, the storage management module 250 sends, to the application server 100, the information fed back by the one or more hard disks 240. The monitoring command is a custom command.

For example, when the application server 100 needs to monitor bandwidth of a hard disk 240A in the storage device 200, the storage management module 250 may obtain the bandwidth reported by the hard disk 240A, and feed back the bandwidth of the hard disk 240A to the application server 100.

For another example, when the application server 100 needs to monitor whether a hard disk 240A and a hard disk 240B in the storage device 200 are normal, the storage management module 250 may separately send a monitoring command to the hard disk 240A and the hard disk 240B through the second API, where the monitoring command is used to request the hard disk 240 to report whether the hard disk 240 works normally. If the storage management module 250 receives response messages that are respectively sent by the hard disk 240A and the hard disk 240B and that indicate normal working, the storage management module 250 may notify the application server 100 that the hard disk 240A and the hard disk 240B work normally. If the storage management module 250 receives a response message that is sent by the hard disk 240A and that indicates normal working, and does not receive a response message from the hard disk 240B, the storage management module 250 may notify the application server 100 that the hard disk 240A works normally and the hard disk 240B is faulty.

It can be learned from the foregoing descriptions that, the storage management module 250 in the storage device 200 may process the management request from the application server 100, and cooperate with the application server 100 to manage the storage device 200. In other words, the storage device 200 may passively complete some management operations at a request of the application server 100. Alternatively, in this embodiment of this application, the storage device 200 may spontaneously perform a management operation. The following describes a manner in which the storage device 200 performs self-management.

1. Independently Configure a Working Mode

It can be learned from the foregoing descriptions that, the storage device 200 have different quantities of data access requests processed in different phases, and also have different processing requirements of different data requests in different phases.

The storage management module 250 may adjust the working mode based on a quantity of received data access requests or a source of the received data access request. For example, when the storage management module 250 finds that a quantity of data access requests presents a rapid growth trend, or a quantity of data access requests within a specific time period exceeds a first threshold, the storage management module 250 may switch the working mode to the peak mode. For another example, when the storage management module 250 finds that a quantity of data access requests presents a decreasing trend, or a quantity of data access requests within a specific time period is less than a second threshold, the storage management module 250 may switch the working mode to the low power mode. For another example, when the storage management module 250 finds that all data access requests come from a user or an application, if the user or the application has a high requirement on a latency, the storage management module 250 may switch the working mode to a mode with a low latency.

The storage management module 250 may configure a working mode of the storage management module 250 in each future time period based on a quantity change trend of the data access requests in history (where the history refers to a past time period). For example, based on a change trend of data access requests in a working day, if the storage management module 250 finds that a quantity of data access requests increases in a noon time period and a night time period, and the quantity of data access requests exceeds the first threshold, the storage management module 250 may consider that the peak mode needs to be used in a noon time period and a night time period in a future working day. If finding that a quantity of data access requests is less than the second threshold in a time period other than the noon time period and the night time period, the storage management module 250 may consider that the low power mode needs to be used in a time period other than the noon time period and the night time period in a future working day.

2. Independently Configure a Priority for Processing the Data Access Requests

Usually, when processing the data access requests, the storage device 200 sequentially processes the data access requests based on a sequence of the data access requests.

However, in some scenarios, data access requests received by the storage device 200 present a regularity, and the storage device 200 may configure, based on the regularity presented by the data access requests, the priority for processing the data access requests. For example, the storage device 200 may receive data access requests from a same user, application, or user of a service level in a short time period. Data accessed by using the data access requests is usually associated with each other. For example, the data accessed by using the data access requests is same data or data that is stored in adjacent locations. If the storage device 200 processes the data access requests in a centralized manner, processing efficiency may be improved. In this scenario, the storage management module 250 may increase a priority of the user, the application, or the user of the service level, to preferentially process the data access requests from the user, the application, or the user of the service level. For another example, the storage device 200 may collect statistics on sources of historical data access requests. If finding that data access requests from a same user, application, or user of a service level increase in a same time period of each day, the storage device 200 may increase a priority of the user, the application, or the user of the service level in the future time period, to preferentially process the data access requests from the user, the application, or the user of the service level.

3. Independently Monitor the Hard Disk 240 of the Storage Device 200

To ensure that the storage device 200 can efficiently process the data access request, the storage device 200 may periodically or aperiodically monitor a status of the hard disk 240 in the storage device 200, for example, obtain bandwidth of the hard disk 240, determine whether the hard disk 240 is faulty, and obtain a latency of the hard disk 240. For example, the storage device 200 may send a custom monitoring command to the hard disk 240 to monitor the status of the hard disk 240. The hard disk 240 may identify the monitoring command, and feed back the status of the hard disk 240 to the storage device 200 according to the monitoring command. The status monitoring of the hard disk 240 implemented by using the custom monitoring command can ensure real-time monitoring of the status of the hard disk 240, and simplify a process of monitoring the status of the hard disk 240.

When processing the data access request, the storage management module 250 may determine, with reference to the working status of the hard disk 240, the hard disk 240 that needs to process the data access request, to ensure that the storage device 200 can allocate the data access request to the hard disk 240 that can efficiently execute the data access request.

Figure 5:
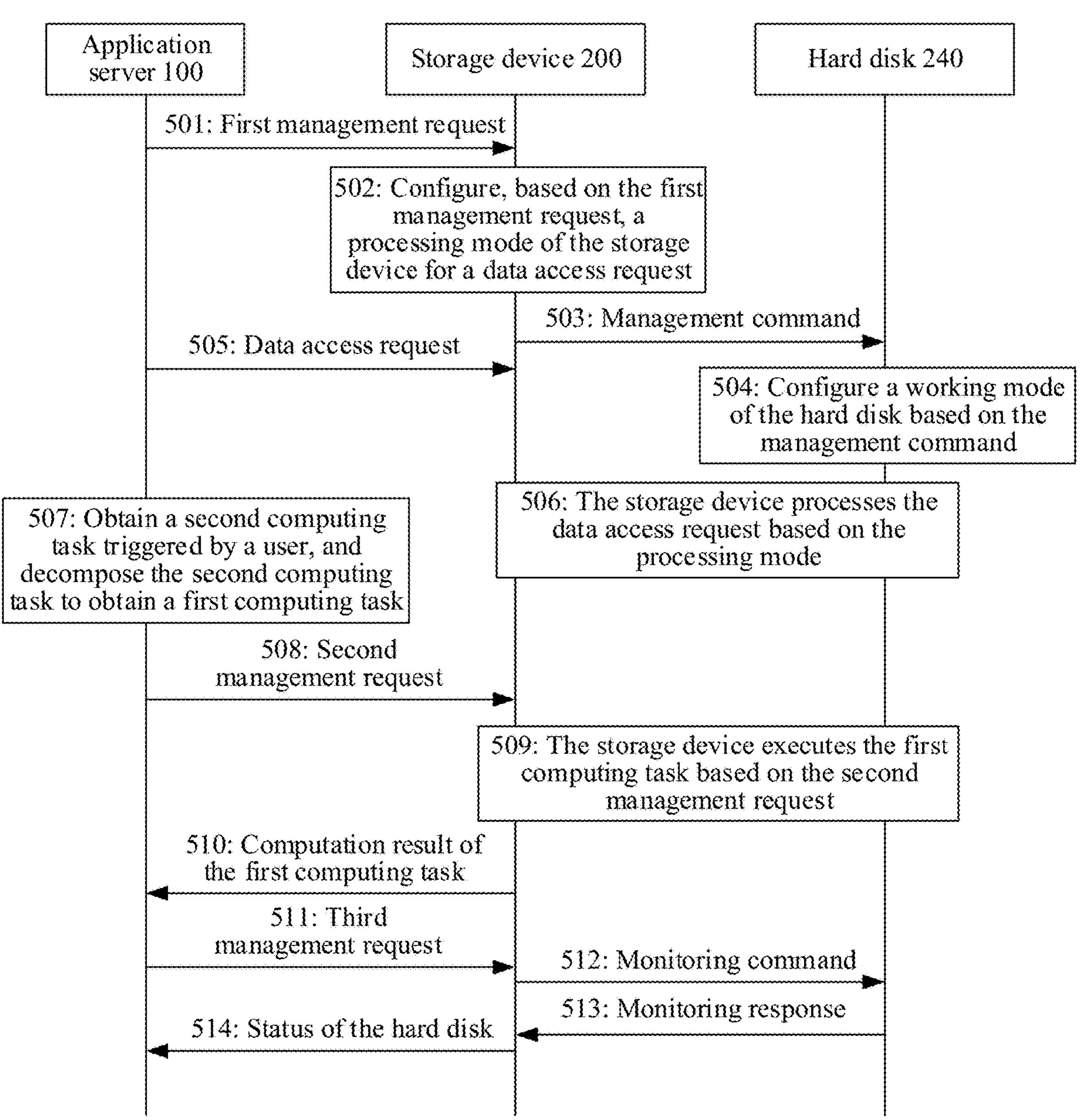
FIG. 5 is a schematic diagram of a data processing method according to this application.

Based on a same inventive concept as the apparatus embodiments, an embodiment of this application further provides a data processing method. The data processing method is jointly performed by the storage device 200 and the application server 100 shown in any one of FIG. 1 to FIG. 4. For related features, refer to the foregoing embodiments. Details are not described herein again. As shown in FIG. 5, the method includes the following steps.

Step 501: The application server 100 sends a first management request to the storage device 200, where the first management request is used to request to configure a processing mode of the storage device 200 for a data access request.

Step 502: The storage device 200 receives the first management request, and configures, based on the first management request, the processing mode of the storage device 200 for the data access request.

Herein, an example in which the first management request is used to request to configure a working mode of the storage device 200 is used. The storage device 200 may perform step 503 to complete configuration of a hard disk 240.

Step 503: The storage device 200 sends a management command to the hard disk 240 of the storage device 200, where the management command is used to request to configure the working mode of the hard disk 240.

Step 504: The hard disk 240 receives the management command, and configures the working mode of the hard disk 240 according to the management command.

Step 505: The application server 100 sends a data access request to the storage device 200, where the data access request is used to request to access data stored in the storage device 200.

Step 506: The storage device 200 receives the data access request, and processes, based on the processing mode, the data access request sent by the application server 100.

Step 507: The application server 100 obtains a second computing task triggered by a user, and decomposes the second computing task to obtain a first computing task.

Step 508: The application server 100 sends a second management request to the storage device 200, where the second management request is used to deliver the first computing task to the storage device 200.

Step 509: The storage device 200 receives the second management request, and executes the first computing task based on the second management request.

Step 510: The storage device 200 feeds back a computation result of the first computing task to the application server 100.

Step 511: The application server 100 sends a third management request to the storage device 200, where the third management request is used to request to monitor the hard disk 240 of the storage device 200.

Step 512: The storage device 200 sends a monitoring command to the hard disk 240 of the storage device 200 based on the third management request, where the monitoring command is used to feed back a status of the hard disk 240.

Step 513: The hard disk 240 feeds back a monitoring response to the storage device 200, where the monitoring response includes the status of the hard disk.

Step 514: The storage device 200 feeds back the status of the hard disk 240 to the application server 100.

All or some of the foregoing embodiments may be implemented by software, hardware, firmware, or any combination thereof. When the software is used to implement embodiments, the foregoing embodiments may be implemented completely or partially in a form of a computer program product. The computer program product includes one or more computer instructions. When the computer program instructions are loaded or executed on a computer, the procedures or functions according to embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable storage that can indicate the computer or any other programmable data processing device to work in a specific manner, so that the instructions stored in the computer-readable storage generate an artifact that includes an instruction apparatus. The instruction apparatus implements a specific function in one or more processes in the flowcharts and/or in one or more blocks in the block diagrams.

These computer program instructions may alternatively be loaded onto a computer or any other programmable data processing device, so that a series of operations and steps are performed on the computer or any other programmable device, to generate computer-implemented processing. Therefore, the instructions executed on the computer or any other programmable device provide steps for implementing a specific function in one or more processes in the flowcharts and/or in one or more blocks in the block diagrams.

It is clear that, a person skilled in the art can make various modifications and variations to this application without departing from the scope of this application. In this way, this application is intended to cover these modifications and variations of this application provided that they fall within the scope of protection of the claims of this application and their equivalent technologies.

What is claimed is:

1. A data processing system, wherein:

the data processing system comprises an application server and a storage device, and the storage device is a node in a storage system;

the application server comprises one or more first processors and one or more first memories coupled to the one or more first processors, wherein the one or more first memories store programming instructions for execution by the one or more first processors to:

send a first management request to the storage device, wherein the first management request requests to configure a processing mode of the storage device for a data access request, wherein the processing mode comprises a processing priority of the data access request; and send a data access request to the storage device, wherein the data access request requests to access data stored in the storage device; and the storage device comprises one or more second processors and one or more second memories coupled to the one or more second processors, wherein the one or more second memories store programming instructions for execution by the one or more second processors to:

receive the first management request;

configure, based on the first management request, the processing mode of the storage device for the data access request, wherein configuring the processing mode comprises configuring a processing priority of the data access request based on the first management request; and process, based on the processing mode, the data access request sent by the application server.

2. The data processing system according to claim 1, wherein when configuring, based on the first management request, the processing mode of the storage device for the data access request, the one or more second memories store programming instructions for execution by the one or more second processors to:

configure a working mode of the storage device based on the first management request.

3. The data processing system according to claim 2, wherein when configuring the working mode of the storage device based on the first management request, the one or more second memories store programming instructions for execution by the one or more second processors to:

send a management command to a hard disk of the storage device based on the first management request, wherein the management command requests to configure a working mode of the hard disk.

4. The data processing system according to claim 1, wherein the one or more first memories store programming instructions for execution by the one or more first processors to send a second management request to the storage device, wherein the second management request is used to deliver a first computing task to the storage device; and the one or more second memories store programming instructions for execution by the one or more second processors to:

execute the first computing task based on the second management request; and feed back a computation result of the first computing task to the application server.

5. The data processing system according to claim 4, wherein the first computing task comprises a part or all of the following:

data search, data migration, data computing, data encoding/decoding, data sorting, or data compression.

6. The data processing system according to claim 1, wherein:

the one or more first memories store programming instructions for execution by the one or more first processors to send a third management request to the storage device, wherein the third management request requests to monitor a hard disk of the storage device; and the one or more second memories store programming instructions for execution by the one or more second processors to:

monitor the hard disk of the storage device based on the third management request, and feed back a status of the hard disk to the application server.

7. The data processing system according to claim 3, wherein the management command indicates an adjustment manner to configure the working mode of the hard disk, and the adjustment manner comprises adjustment of a throughput or a background operation frequency of the hard disk.

8. The data processing system according to claim 6, wherein the status of the hard disk comprises at least one of: a service life of the hard disk, a latency of the hard disk, an error condition of the hard disk, or whether the hard disk works normally.

9. A storage device, wherein the storage device comprises one or more processors, one or more memories, and a hard disk, the one or more memories store programming instructions for execution by the one or more processors to:

implement interaction between the storage device and the hard disk of the storage device;

receive a first management request from an application server, wherein the first management request requests to configure a processing mode of the storage device for a data access request, wherein the processing mode comprises a processing priority of the data access request;

configure the processing mode of the storage device based on the first management request, wherein configuring the processing mode comprises configuring a processing priority of the data access request based on the first management request; and process, based on the processing mode, the data access request sent by the application server.

10. The storage device according to claim 9, wherein the storage device further comprises:

a network interface card, wherein the network interface card comprises the one or more processors.

11. The storage device according to claim 9, wherein the processing mode comprises a working mode of the storage device, and when configuring the processing mode of the storage device based on the first management request, the one or more memories store programming instructions for execution by the one or more processors to:

send, based on the first management request, a management command to the hard disk of the storage device, wherein the management command requests to configure a working mode of the hard disk.

12. The storage device according to claim 9, wherein the one or more memories store programming instructions for execution by the one or more processors to:

receive a second management request sent by the application server, wherein the second management request is used to deliver a first computing task to the storage device;

obtain data from the hard disk based on the second management request;

execute the first computing task based on the obtained data; and feed back a computation result of the first computing task to the application server.

13. The storage device according to claim 9, wherein the one or more memories store programming instructions for execution by the one or more processors to:

receive a third management request sent by the application server, wherein the third management request requests to monitor the hard disk of the storage device;

send, based on the third management request, a monitoring command to the hard disk of the storage device, wherein the monitoring command requests to feed back a status of the hard disk;

receive a monitoring response from the hard disk, wherein the monitoring response comprises the status of the hard disk; and feed back the status of the hard disk to the application server.

14. A data processing method, wherein the data processing method comprises:

receiving, by a storage device, a first management request sent by an application server, wherein the first management request requests to configure a processing mode of the storage device for a data access request, wherein the processing mode comprises a processing priority of the data access request;

configuring, by the storage device based on the first management request, the processing mode of the storage device for the data access request, wherein configuring the processing mode comprises configuring a processing priority of the data access request based on the first management request; and processing, by the storage device based on the processing mode, the data access request sent by the application server.

15. The data processing method according to claim 14, wherein the configuring, by the storage device based on the first management request, the processing mode of the storage device for the data access request comprises:

configuring, by the storage device, a working mode of the storage device based on the first management request.

16. The data processing method according to claim 15, wherein configuring the working mode of the storage device based on the first management request comprises:

sending a management command to a hard disk of the storage device based on the first management request, wherein the management command requests to configure a working mode of the hard disk.

17. The data processing method according to claim 15, wherein the data processing method further comprises:

receiving, by the storage device, a second management request sent by the application server, wherein the second management request is used to deliver a first computing task to the storage device;

executing, by the storage device, the first computing task based on the second management request; and feeding back a computation result of the first computing task to the application server.

18. The data processing method according to claim 17, wherein the first computing task comprises a part or all of the following:

data search, data migration, data computing, data encoding/decoding, data sorting, or data compression.

19. The data processing method according to claim 15, wherein the data processing method further comprises:

receiving, by the storage device, a third management request sent by the application server, wherein the third management request requests to monitor a hard disk of the storage device;

monitoring, by the storage device, the hard disk of the storage device based on the third management request; and feeding back a status of the hard disk to the application server.

20. The data processing method according to claim 19, wherein the monitoring, by the storage device, the hard disk of the storage device based on the third management request comprises:

sending, by the storage device, a monitoring command to the hard disk of the storage device based on the third management request, wherein the monitoring command requests to feed back the status of the hard disk; and receiving, by the storage device, a monitoring response from the hard disk, wherein the monitoring response comprises the status of the hard disk.

* * * * *